US012586913B2

(12) United States Patent
Yoo et al.

(10) Patent No.: US 12,586,913 B2
(45) Date of Patent: Mar. 24, 2026

(54) WAVEGUIDE ANTENNA

(71) Applicant: HJWAVE Co., Ltd., Seongnam-si (KR)

(72) Inventors: Tae Hwan Yoo, Incheon (KR); Sung Hwan Kim, Gwangmyeong-si (KR)

( * ) Notice: Subject to any disclaimer, the term of this patent is extended or adjusted under 35 U.S.C. 154(b) by 0 days.

(21) Appl. No.: 18/389,841

(22) Filed: Dec. 20, 2023

(65) Prior Publication Data

US 2024/0213683 A1 Jun. 27, 2024

(30) Foreign Application Priority Data

Dec. 21, 2022 (KR) ........................ 10-2022-0180807
Oct. 13, 2023 (KR) ........................ 10-2023-0136689

(51) Int. Cl.
*H01Q 13/02* (2006.01)
*H01Q 21/00* (2006.01)

(52) U.S. Cl.
CPC ......... *H01Q 13/02* (2013.01); *H01Q 21/0037* (2013.01)

(58) Field of Classification Search
CPC .... H01Q 13/02; H01Q 13/06; H01Q 21/0037; H01Q 21/08; H01Q 21/29; H01P 3/123; H01P 5/024; H01P 5/082; H01P 5/12
See application file for complete search history.

(56) References Cited

U.S. PATENT DOCUMENTS

| | | | | |
|---|---|---|---|---|
| 10,381,317 | B2 | 8/2019 | Maaskant et al. | |
| 11,050,163 | B2 * | 6/2021 | Glogowski | H01Q 21/064 |
| 2020/0014107 | A1 | 1/2020 | You et al. | |
| 2020/0076395 | A1 * | 3/2020 | Kamo | G01S 7/032 |

FOREIGN PATENT DOCUMENTS

| | | | | | |
|---|---|---|---|---|---|
| CN | 106877004 | A | * | 6/2017 | H01Q 1/50 |
| CN | 110504530 | A | * | 11/2019 | H01Q 13/06 |
| CN | 114335957 | A | | 4/2022 | |
| KR | 10-2013-0066906 | | | 6/2013 | |

OTHER PUBLICATIONS

English Specification of 10-2013-0066906.
English Specification of CN114335957A.
Zaman, Ashraf Uz; Kildal, Per-Simon, "Wide-Band Slot Antenna Arrays With Single-Layer Corporate-Feed Network in Ridge Gap Waveguide Technology," IEEE Transactions on Antennas and Propagation, vol. 62, No. 6, Jun. 2014.

* cited by examiner

*Primary Examiner* — Hoang V Nguyen
(74) *Attorney, Agent, or Firm* — ANTONIO HA & U.S. PATENT, LLC

(57) ABSTRACT

The present disclosure is to provide a waveguide antenna to which a horn-type horizontal distribution divider structure is applied, and the waveguide antenna according to the present disclosure may comprise the first layer having a power feeder provided in the horizontal direction and the horizontal divider connected to the power feeder and provided in the horizontal direction, the second layer including the first divider power feeder connected to the first layer and connected to one side of the horizontal divider through the first through hole, the second divider power feeder connected to the other side of the horizontal divider through the second through hole, the first and second radio wave radiating units connected to the first divider power feeder, and the third and fourth radio wave radiating units connected to the second divider power feeder.

3 Claims, 8 Drawing Sheets

WAVEGUIDE ANTENNA

CROSS-REFERENCE TO RELATED APPLICATION(S)

This application claims priority to Korean Patent Application Nos. 10-2022-0180807, filed on Dec. 21, 2022, and 10-2023-0136689, filed on Oct. 13, 2023, in the Korean Intellectual Property Office, the disclosures of which are incorporated by reference herein in their entireties.

TECHNICAL FIELD

The present disclosure relates to a waveguide antenna.

DISCUSSION OF RELATED ART

In general, future automotive corner radars should have wide-angle characteristics (e.g., more than 150 degrees Az) for object detection at intersections and high resolution and therefore broadband characteristics (e.g., 5 GHz or more) for detection of small objects.

In order to provide these characteristics, the antenna itself must be able to satisfy both wide-angle characteristics and broadband characteristics. However, antennas applied to automotive radars that are currently on the market as commercial products cannot provide both wide-angle and broadband characteristics and can only provide one of the wide-angle or broadband characteristics. Waveguide antenna technologies applied to these technologies are generally known as slot type and horn type technologies.

The information disclosed in the background of the present disclosure is only for improving understanding of the background of the present disclosure and therefore may include information that does not constitute prior art.

SUMMARY

The present disclosure is to provide a waveguide antenna to which a horn-type horizontal distribution divider structure is applied. Specifically, the present disclosure is to provide a vertical horn-type antenna combination structure using a horizontally deployed divider structure.

A waveguide antenna according to the present disclosure may comprise a first layer having a power feeder provided in a horizontal direction and a horizontal divider connected to the power feeder and provided in the horizontal direction, a second layer including a first divider power feeder connected to the first layer and connected to one side of the horizontal divider through a first through hole, a second divider power feeder connected to the other side of the horizontal divider through a second through hole, first and second radio wave radiating units connected to the first divider power feeder, and third and fourth radio wave radiating units connected to the second divider power feeder.

As an embodiment, the power feeder of the first layer may include a feeding line for feeding the horizontal divider and a ridge provided to protrude in a center along the feeding line.

As an embodiment, the ridge may include a thickness step part whose thickness decreases at an end in contact with the horizontal divider.

As an embodiment, the feeding line may include a width step part whose width increases at the end in contact with the horizontal divider.

As an embodiment, the thickness step part may be located inside the width step part.

As an embodiment, the width of the first and second radio wave radiating units of the second layer may be smaller than the width of the first divider power feeder, and the width of the third and fourth radio wave radiating units of the second layer may be smaller than the width of the second divider power feeder.

As an embodiment, the first divider power feeder and the second divider power feeder of the second layer may be separated by a partition.

The present disclosure provides a waveguide antenna to which a horn-type horizontal distribution divider structure is applied. Specifically, the present disclosure provides a vertical horn-type antenna combination structure using a horizontally deployed divider structure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
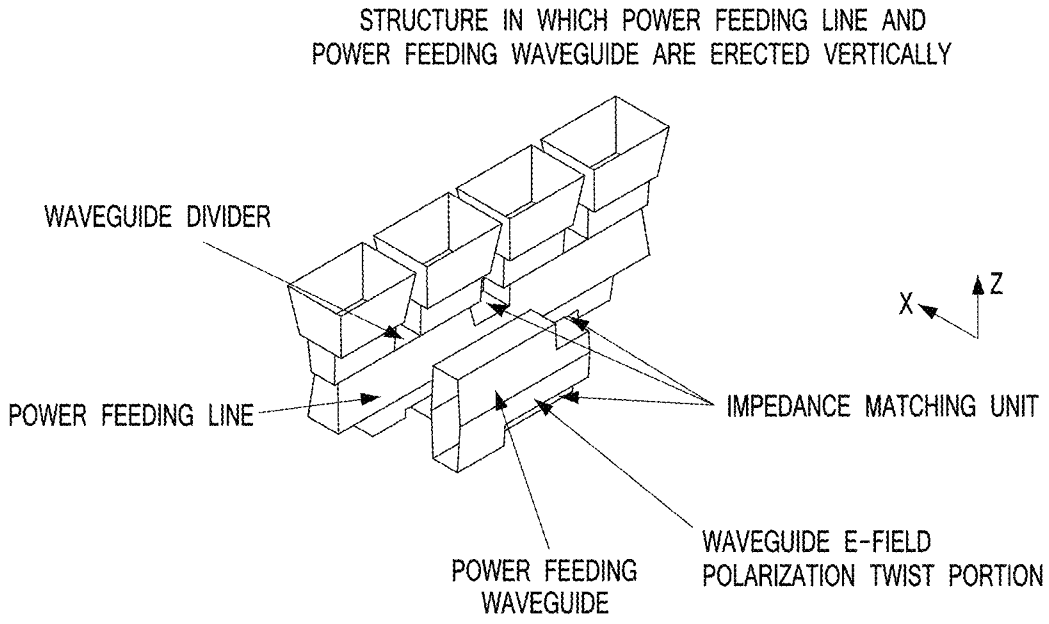
FIG. 1 is a schematic diagram showing a waveguide antenna with a two-layer structure according to a comparative example.

Hereinafter, preferred embodiments according to the present disclosure are described in detail with reference to the accompanying drawings.

The present disclosure is provided to more completely explain the present disclosure to those skilled in the art, and the following examples may be modified into various other forms, and the scope of the present disclosure is not limited to the following examples. Rather, these examples make the disclosure more complete and is provided in order to completely convey the spirit of the present disclosure to those skilled in the art.

Further, in the following drawings, the thickness and size of each layer are exaggerated for convenience and clarity of description, and the same symbols in the drawings refer to the same elements. As used herein, the term "and/or" includes any one and all combinations of one or more of the listed items. Further, as used herein, the term "connected" refers not only to the case where member A and member B are directly connected, but also to the case where member C is interposed between member A and member B to indirectly connect member A and member B.

The terms used herein are used to describe specific embodiments and are not intended to limit the present disclosure. As used herein, the singular forms include the plural forms unless the context clearly indicates otherwise. Additionally, as used herein, the terms "comprise," or "include," and/or "comprising," or "including" specify the presence of stated shapes, numbers, steps, operations, members, elements and/or groups thereof but is not intended to exclude the presence or addition of one or more other shapes, numbers, operations, members, elements and/or groups thereof.

As used herein, the terms "first," "second," etc. are used to describe various members, parts, regions, layers and/or portions, but it is obvious that these members, parts, regions, layers and/or parts should not be limited by these terms. These terms are used only to distinguish one member, component, region, layer or portion from another member, component, region, layer or portion. Accordingly, a first member, component, region, layer or portion described below may refer to a second member, component, region, layer or portion without departing from the teachings of the present disclosure.

Space-related terms such as "beneath," "below," "lower," "above," and "upper" may be used to facilitate understanding of one element or feature and another element or feature shown in the drawings. These space-related terms are for easy understanding of the present disclosure according to various process states or usage states of the present disclosure and are not intended to limit the present disclosure. For example, if an element or feature in a drawing is inverted, an element or feature described as "beneath" or "below" becomes "above" or "upper." Therefore, "below" is a concept encompassing "above" or "below."

FIG. 1 is a schematic diagram showing a waveguide antenna with a two-layer structure according to a comparative example. As shown in FIG. 1, the horn-type antenna using two layers according to the comparative example provides a vertical waveguide to implement a power feeding line to a vertical antenna divider (waveguide divider of the above shape) and the power feeding waveguide is also provided in vertical direction. Therefore, in order to connect the power feeding line and the power feeding waveguide, a twist portion is required to change the polarization of the electric field (E-Field), and many such impedance matching structures of the twist portion and matching structures of the divider are required. Thus, the structure of the antenna is somewhat complicated.

Figure 2:
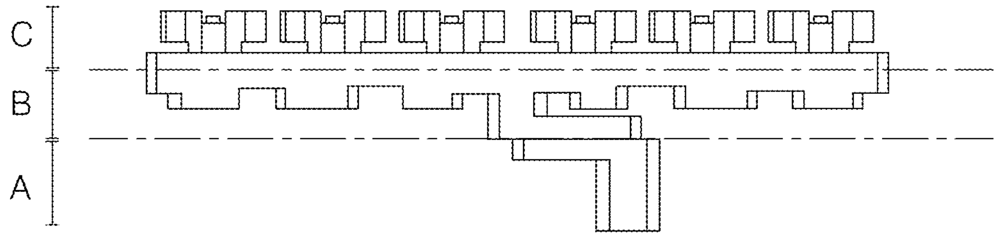
FIG. 2 is a schematic diagram showing a waveguide antenna with a three-layer structure according to a comparative example.

FIG. 2 is a schematic diagram showing a waveguide antenna with a three-layer structure according to a comparative example. As shown in FIG. 2, the Horn Type Center Feeding antenna according to the comparative example must be composed of three layers, so the overall antenna is thick (i.e., three layers of reference numerals A, B, and C).

A structure that can operate as a horn-type antenna while simplifying the antenna structure according to this comparative example is described below.

Figure 3A:
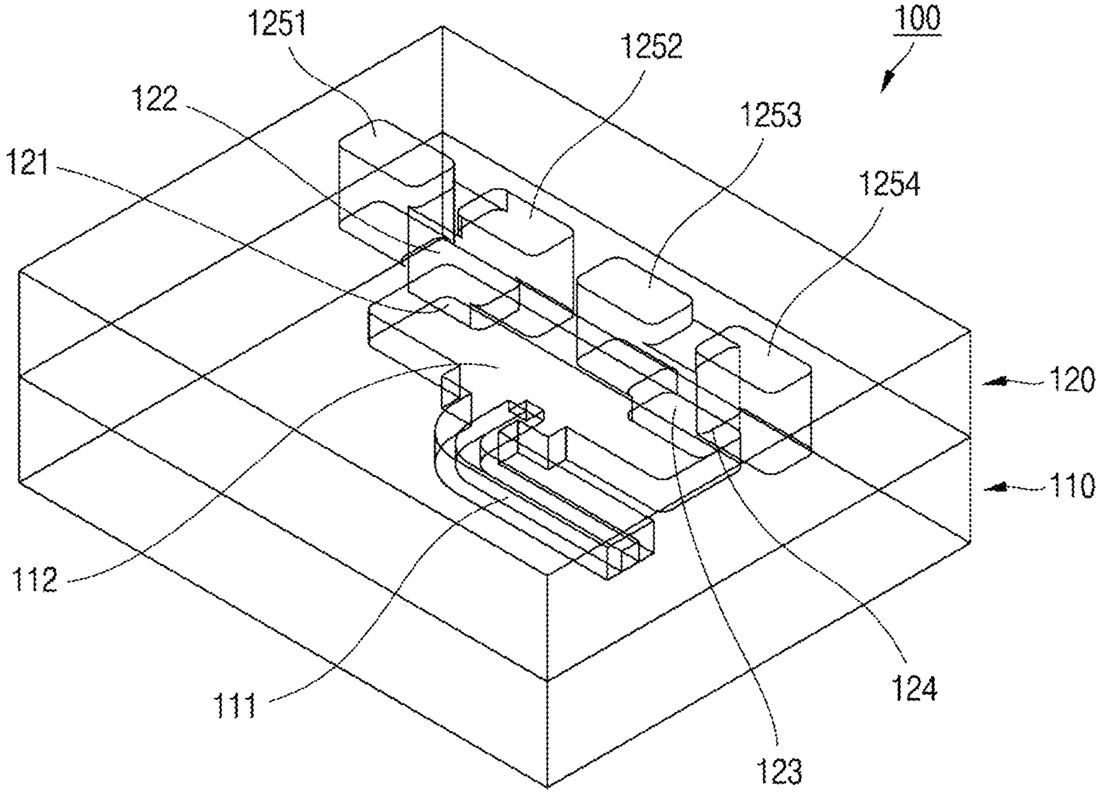
FIGS. 3A, 3B, and 3C are perspective and cross-sectional views showing an exemplary waveguide antenna according to the present disclosure.
Figure 3B:
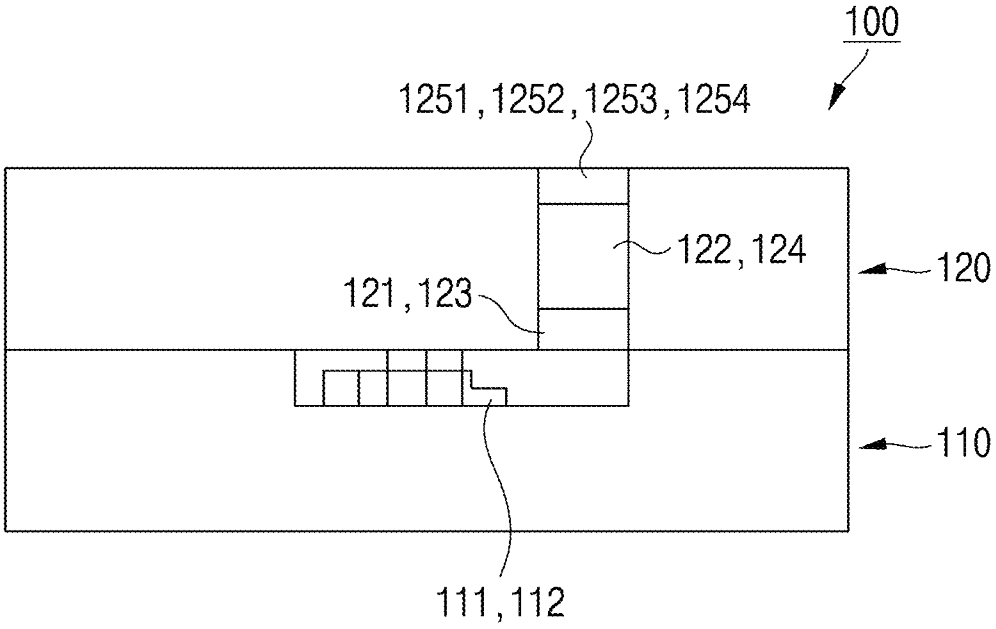
Figure 3C:
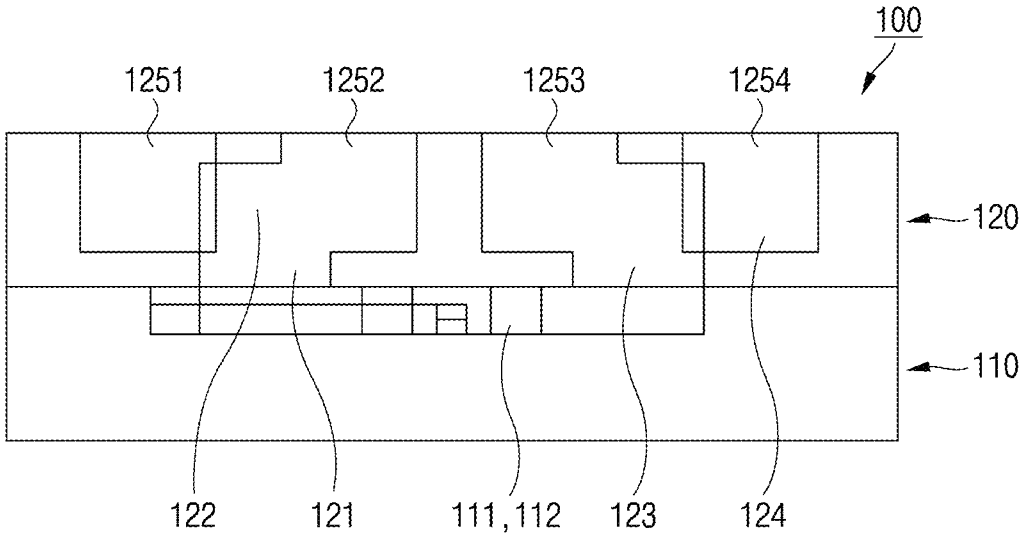

FIGS. 3A, 3B, and 3C are perspective and cross-sectional views showing an exemplary waveguide antenna 100 according to the present disclosure. As shown in FIGS. 3A, 3B, and 3C, the exemplary waveguide antenna 100 may include the plate-shaped first layer 110 and the plate-shaped second layer 120.

The first layer 110 may include the power feeder 111 provided in a substantially horizontal direction and the horizontal divider 112 connected to the power feeder 111 and provided in a substantially horizontal direction. In some examples, the power feeder 111 and the horizontal divider 112 may each be implemented as a horizontal waveguide structure.

The second layer 120 may be connected to the first layer 110. The second layer 120 may include the first divider power feeder 122 connected to one side of the horizontal divider 112 of the first layer 110 through the first through hole 121, the second divider power feeder 124 connected to the other side of the horizontal divider 112 through the second through hole 123, the first radio wave radiating unit 1251 and the second radio wave radiating unit 1252 connected to the first divider power feeder 122, and the third radio wave radiating unit 1253 and the fourth radio wave radiating unit 1254 connected to the second divider power feeder 111. In some examples, the first divider power feeder 122 and the second divider power feeder 124 may each be implemented as a horizontal waveguide structure. In some examples, the first, second, third, and fourth radio wave radiating units 1251, 1252, 1253, and 1254 may be coupled to the divider power feeders 122 and 121 in a horn shape. In some examples, the first, second, third, and fourth radio wave radiating units 1251, 1252, 1253, and 1254 may be implemented as a vertical horn structure. In some examples, the first, second, third, and fourth radio wave radiating units 1251, 1252, 1253, and 1254 may be referred to as first, second, third, and fourth elements or members, respectively.

The first layer 110 and the second layer 120 may include an insulating body molded using a plastic injection method and a conductive layer coated on the surface of the insulating body. The insulating body may be a general thermosetting or thermoplastic resin, and the conductive layer may include general copper, aluminum, nickel, or an alloy thereof. In some examples, the conductive layer may be provided on all externally exposed areas of the waveguide antenna 100, that is, all surfaces in contact with air. In some examples, the first layer 110 and the second layer 120 may be made of the conductive layer without an insulating body to be connected to each other.

Figure 4:
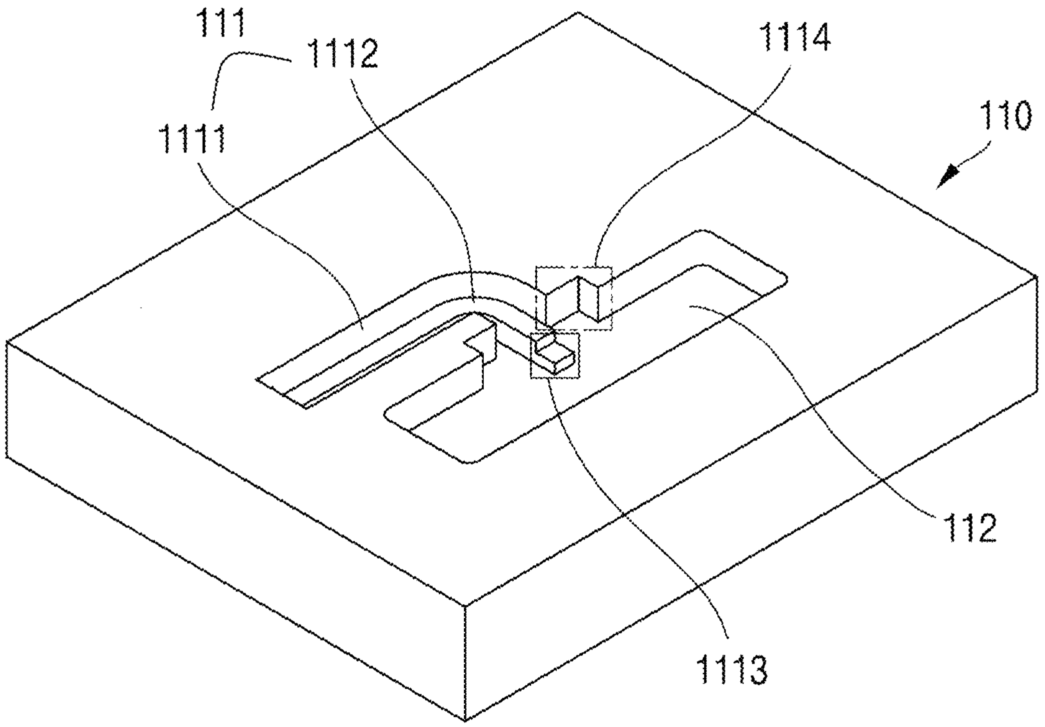
FIG. 4 is a perspective view showing the first layer of an exemplary waveguide antenna according to the present disclosure.

FIG. 4 is a perspective view showing the first layer 110 of an exemplary waveguide antenna 100 according to the present disclosure. As shown in FIG. 4, the first layer 110 includes a substantially flat upper surface and a substantially flat lower surface, which is the opposite surface, and it may be provided by a horizontal waveguide provided with the antenna elements being dug to a certain depth from the upper surface to the lower surface.

In some examples, the power feeder 111 of the first layer 110 may include the power feeding line 1111 for feeding the horizontal divider 112 and the ridge 1112 provided by protruding in the center along the power feeding line 1111 (being spaced apart from the inner walls on both sides). The ridge 1112 is provided at the center along the horizontal waveguide-shaped power feeding line 1111 to further reduce the gap between antennas.

In some examples, both the power feeding line 1111 and the ridge 1112 may extend or be provided in a substantially horizontal direction.

In some examples, the ridge 1112 may further include a thickness step part 1113 whose thickness is relatively small at an end that contacts the horizontal divider 112.

In some examples, the feeding line 1111 may include two width steps 1114 whose widths are relatively expanded at both ends that contact the horizontal divider 112.

In some examples, thickness step 1113 may be located between or inside two width steps 1114.

In this way, the power feeding line 1111 and the horizontal divider 112 can be combined through a ridge and hollow waveguide combination structure, thereby maintaining the antenna volume small. Further, the thickness step 1113 and/or the width step 1114 are provided for impedance matching of the ridge and hollow waveguide combination structures, so that the impedance between the power feeding line 1111 and the horizontal divider 112 may be easily matched.

Figure 5:
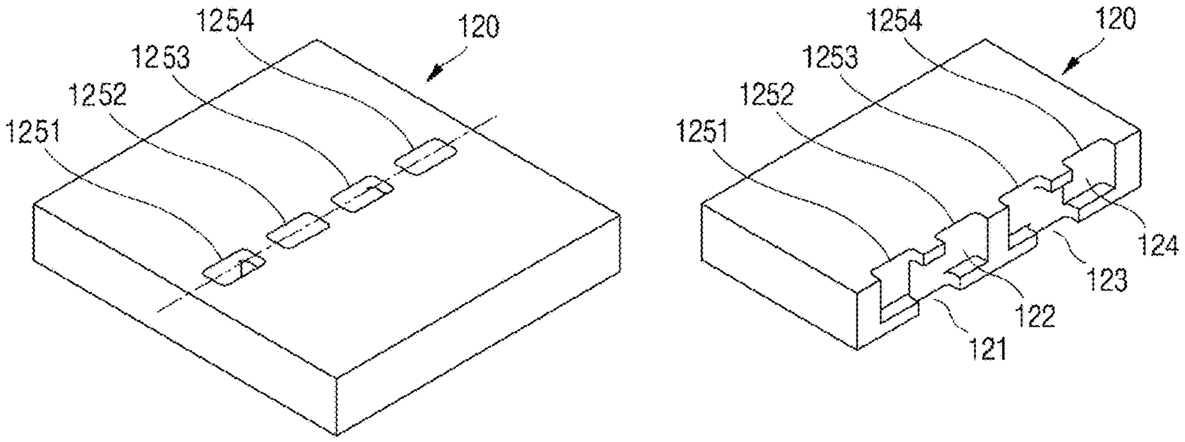
FIG. 5 is a perspective view and cross-sectional view showing the second layer of an exemplary waveguide antenna according to the present disclosure.

FIG. 5 is a perspective view and cross-sectional view showing the first layer 120 of an exemplary waveguide antenna 100 according to the present disclosure. As shown in FIG. 5, the second layer 120 includes a substantially flat upper surface and a substantially flat lower surface, which is the opposite surface, and it may be provided by a horizontal waveguide provided with the antenna elements being penetrated from the upper surface to the lower surface and dug to a certain depth from the lower surface to the upper surface.

In some examples, the second layer 120 may include the horizontal first divider power feeder 122 connected to one side of the horizontal divider 112 of the first layer 110 through the vertical first through hole 121 and the horizontal second divider power feeder 124 connected to the other side of the horizontal divider 112 through the vertical second through hole 123. In some examples, the first divider power feeder 122 and the second divider power feeder 124 may be separated by a partition. Further, the second layer 120 may include the first and second radio wave radiating units 1251 and 1252 connected in the vertical direction on the first divider power feeder 122 and the third and fourth radio wave radiating units 1253 and 1254 connected in the vertical direction on the second divider power feeder 123. In some examples, the first, second, third, and fourth radio wave radiating units 1251, 1252, 1253, and 1254 may be connected to the divider power feeders 122 and 121 in a horn shape.

In some examples, the horizontal width of the first and second radio wave radiating units 1251 and 1252 of the second layer 120 may be smaller than the horizontal width of the first divider power feeder 122, and the horizontal width of the third and fourth radio wave radiating units 1253 and 1254 of the second layer 120 may be smaller than the horizontal width of the second divider power feeder 124.

In this way, in the present disclosure, unlike the comparative example, the waveguide direction of the power feeding line 1111 is approximately horizontal, and the power feeder 111 of the entire antenna structure is also approximately horizontal, so the present disclosure does not require the electric field twist portion mentioned in the structure of the comparative example, and impedance matching is achieved using the thickness step 1113 of the ridge 1112 and the width step 1114 of the waveguide 1111, making the structure simple. Due to this, the entire antenna layer configuration can be made up of two layers.

Figure 6:
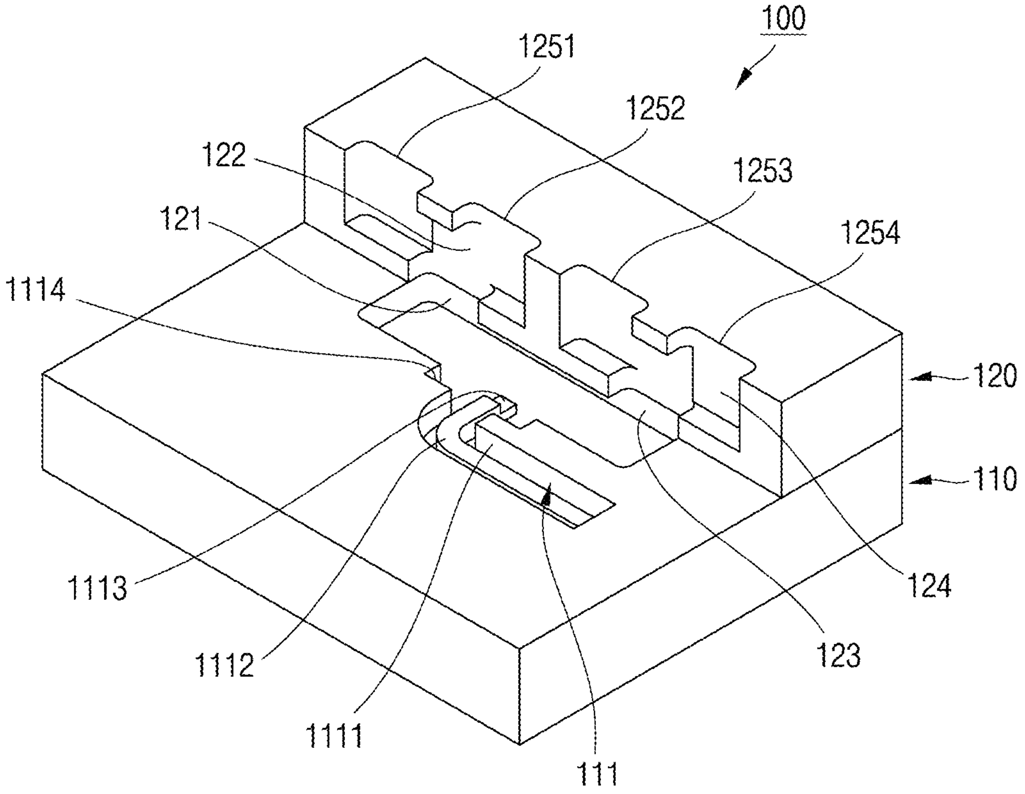
FIG. 6 is a partial cross-sectional perspective view showing the combined structure of the first and second layers of an exemplary waveguide antenna according to the present disclosure.

FIG. 6 is a partial cross-sectional perspective view showing the combined structure of the first and second layers 110, 120 of an exemplary waveguide antenna 100 according to the present disclosure. As shown in FIG. 6, the first divider power supply unit 122 in the horizontal direction and the second divider power supply unit 124 in the horizontal direction may be combined through the first and second through holes 121 and 123, respectively, on one horizontal divider 112. In some examples, the power feeder 111, the horizontal divider 112, and the first and second divider power feeding units 122 and 124 may all be provided to extend in a substantially horizontal direction.

In this way, the structure of combining the first and second layers 110 and 120 is the same as above, and the power distributed through the horizontal divider 112 is transmitted in phase to the first divider power feeder 122 and the second divider power feeder 124, and then power is transmitted to the first, second, third, and fourth radio wave radiating units 1251, 1252, 1253, and 1254 through power distribution in each divider.

In this way, the present disclosure can provide a waveguide antenna 100 to which a horn-type horizontal distribution divider structure is applied. To explain it differently, the present disclosure can provide a vertical horn-type antenna coupling structure using a horizontally deployed divider structure.

The above description is only for one embodiment for implementing an exemplary waveguide antenna according to the present disclosure. The present disclosure is not limited to the above embodiment. As claimed in the claims below, it is understood that the technical spirit of the present disclosure exists to the extent that various changes can be made by those skilled in the art without departing from the gist of the present disclosure.

What is claimed is:

1. A waveguide antenna comprising:

a first layer having a power feeder provided in a horizontal direction and a horizontal divider connected to the power feeder and provided in the horizontal direction; and a second layer including a first divider power feeder connected to the first layer and connected to one side of the horizontal divider through a first through hole, a second divider power feeder connected to the other side of the horizontal divider through a second through hole, first and second radio wave radiating units connected to the first divider power feeder, and third and fourth radio wave radiating units connected to the second divider power feeder-, wherein the power feeder of the first layer includes a feeding line for feeding the horizontal divider and a ridge provided to protrude in a center along the feeding line;

the ridge includes a thickness step part whose thickness decreases at an end in contact with the horizontal divider;

the feeding line includes a width step part whose width increases at the end in contact with the horizontal divider; and the thickness step part is located inside the width step part.

2. The waveguide antenna of claim 1, wherein the width of the first and second radio wave radiating units of the second layer is smaller than the width of the first divider power feeder, and the width of the third and fourth radio wave radiating units of the second layer is smaller than the width of the second divider power feeder.

3. The waveguide antenna of claim 1, wherein the first divider power feeder and the second divider power feeder of the second layer are separated by a partition.

* * * * *